June 28, 1932.  R. H. TAYLOR  1,865,050
FLUID METERING APPARATUS
Filed June 2, 1927  2 Sheets-Sheet 1
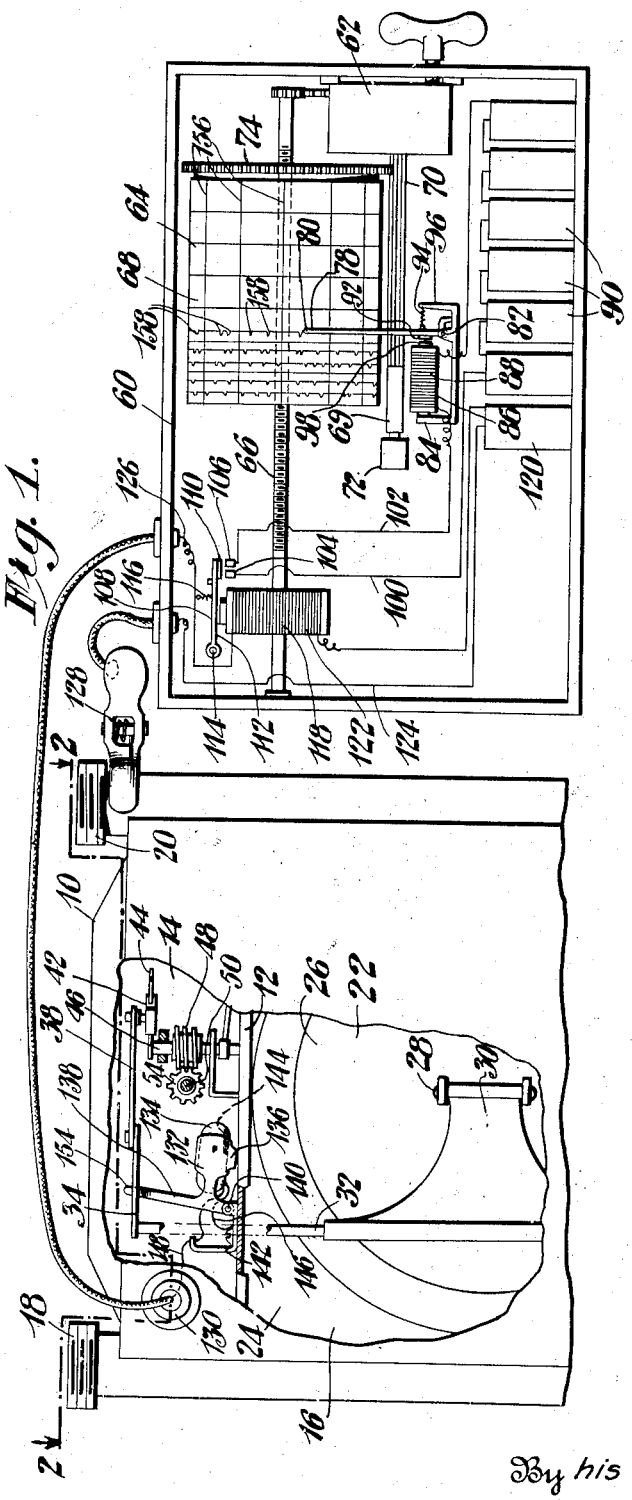
Inventor
ROBERT H. TAYLOR
By his Attorney
Edmund G. Borden

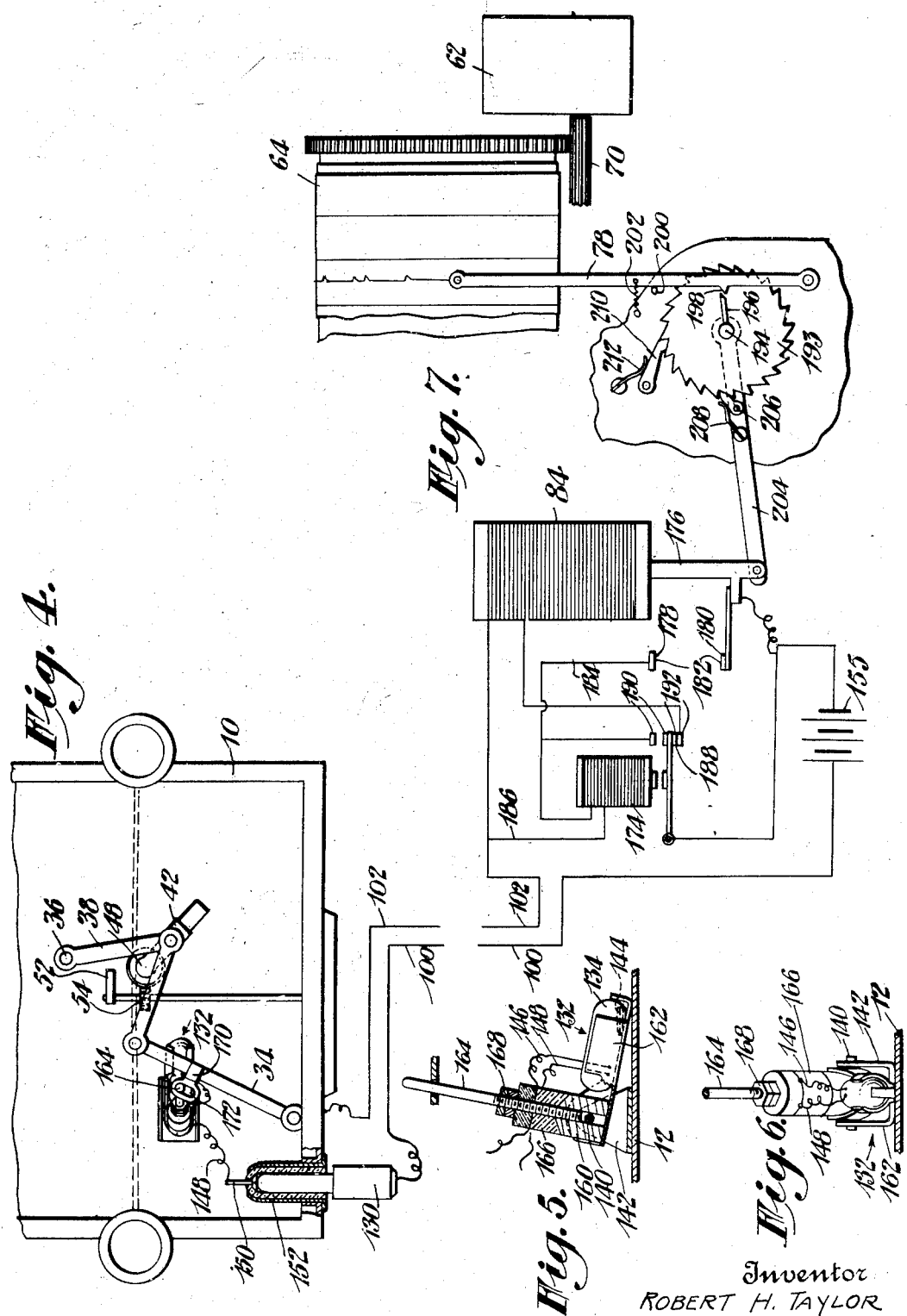

Patented June 28, 1932

1,865,050

UNITED STATES PATENT OFFICE

ROBERT H. TAYLOR, OF DENVER, COLORADO, ASSIGNOR TO DOHERTY RESEARCH COMPANY, OF NEW YORK, N. Y., A CORPORATION OF DELAWARE

FLUID METERING APPARATUS

Application filed June 2, 1927. Serial No. 195,966.

This invention relates to fluid metering apparatus, and more particularly to apparatus for automatically taking a permanent record of the rate at which fluid is withdrawn from a fluid supply line during any unit interval of time.

Within the past few years the inequitable custom of basing the charges for gas household and industrial heating service altogether on one factor of service, for example, on the number of cubic feet of gas used by the customer during a period of 30 days, has been displaced in many parts of the country by new and more equitable methods of charging based on more than one factor of service. One of the best known of the new systems of charging for gas service is known as the Doherty three-part rate system, which is designed to distribute all of the costs of service equitably between individual customers in direct proportion to their responsibility for those costs. The Doherty three-part rate system of charging embodies three separate and distinct charges, referred to respectively as customer charge, demand charge and consumption charge. Under the customer charge there are distributed equally to each customer those service expenses which bear no relation to his total gas consumption in a month or a year, or to his maximum demand for service in a given period, as for example the costs of meter reading, bookkeeping, and fixed charges on that portion of the gas company's investment which is directly proportional to the number of customers on the system. Under the demand charge there are distributed to each customer in proportion to his maximum hourly demand on the supply system those fixed charges on that portion of the gas company's investment which do vary in accordance with the maximum demand placed on the system by the customer. Thus the size of the distributing lines is directly dependent on the size of the maximum demand which will be placed on them by the customer, irrespective of whether that maximum demand is occasioned by supplying one customer or ten thousand customers. The customer charge and the demand charge are both based on what may be termed the "readiness to serve" method of charging. The third or consumption charge is analogous to the prior systems of charging commonly in use a few years ago, and comprises a charge for the actual amount of gas consumed by the customer, usually set at a fixed rate per thousand cubic feet of gas used.

One object of the present invention is to provide apparatus for taking automatically a permanent record of the rate at which fluid is withdrawn from a fluid supply line or other source of supply during any interval of time.

A number of devices are now obtainable intended for use in making a record of the maximum demand of a customer on the equipment of a gas company, for example, during a unit interval of time. The records which are thus taken are thereafter available to the gas company as a basis for approximating the demand charge to be made against the customer under the aforementioned three-part rate or other multiple rate system of charging. So far as is known, however, none of the demand recording devices which are now available have proven to be in all respects entirely satisfactory in service. Thus almost all such recording devices have proven more or less unsatisfactory in that they are apt to be intricate, or fragile, or costly in construction, or relatively inaccurate in operation or short lived and expensive in upkeep, their repair being beyond the capacity of the ordinary meter man.

Another object of the present invention is to provide a fluid demand recording device of simple and rugged construction which is also accurate in operation over either long or short time intervals and which embodies the advantageous features of low initial cost and low upkeep expense.

In addition to being in general intricate and expensive as regards their installation and upkeep, most of the demand recording devices now available are so designed that they can be applied only in connection with certain definite types of service and with meter equipment having certain definite limits of capacity and design.

Accordingly another object of the present invention is to provide a fluid demand recording device that is flexible in its application and has a broad field of service.

In order to insure that any fluid demand recording apparatus will have a broad field of service it is of great importance that it embody a recording device of a type that can be physically and operatively connected, at small expense and with minimum labor, to any one of a large number of different types of fluid volume meters which are now in service in different parts of the country. Moreover it is of great importance that the several parts of the fluid demand recording device be protected not only from mechanical injury through dust and corrosion, but also from danger due to tampering or interference by unauthorized persons.

One feature of the present invention contemplates a fluid demand recording apparatus which in its assembled form will embody means for effecting physical and operative connection between any type of fluid volume meter and any type of electrically controlled and chronometrically operated demand recording instrument.

Another feature of the invention contemplates a fluid demand recording apparatus of the above character in which both such physical and operative connections can be made substantially instantaneously and with slight expenditure of energy.

Another object of the invention is to provide a fluid demand recording apparatus having its vital parts protected from mechanical injury and from danger due to tampering with and interference by unauthorized persons.

With these and other objects and features in view the invention consists in the improved fluid demand recording apparatus hereinafter described and particularly defined in the claims.

The various features of the fluid demand recording apparatus forming the subject of the present invention are illustrated in the accompanying drawings, in which:—

Fig. 1 is a vertical elevation with parts broken away, illustrating in diagrammatic form an assembled fluid demand recording apparatus of the type embodying the preferred form of the invention.

Fig. 2 is a plan view, partly in section, of a portion of the upper compartment of the volume dry gas meter illustrated in Fig. 1, taken on the line 2—2 of Fig. 1; and Fig. 3 is a small scale diagrammatic view in vertical elevation of another modification of the fluid demand and recording apparatus illustrated in Fig. 1;

Fig. 4 is a plan view, partly in section, of another modification of the meter mechanism illustrated in Fig. 2, taken on the line 2—2 of Fig. 1;

Fig. 5 is a vertical front elevation with parts in section of a modified form of the circuit closing device illustrated in Fig. 1;

Fig. 6 is a vertical end elevation of the circuit closing device illustrated in Fig. 5;

Fig. 7 is a vertical elevation illustrating, in diagrammatic form, a modification of the demand recording instrument illustrated in Fig. 1.

Essentially the fluid demand recording apparatus constituting the subject of the present invention comprises the combination with any well-known volume fluid meter and any well-known electrically controlled and chronometrically operated demand recording instrument, of extremely simple, economical, and practicable means for effecting both physical and operative connection substantially instantaneously between some part of the meter which moves at a rate proportional to the rate at which fluid is passed by the meter, and the electrical control system of the recording instrument. For purposes of illustration the means above referred to, whereby to effect physical and operative connections between a volume type fluid meter and an electrically controlled and chronometrically operated demand recording instrument, have been shown in their preferred form and arrangement in the accompanying drawings as physically and operatively connected with one of the well-known types of dry gas meters and with a well-known type of electrically controlled and chronometrically operated demand recording instrument. It is to be understood, however, that the scope of the present invention is not limited to the specific combination illustrated in the drawings, but that other combinations of said means with other types of fluid volume meters and with other types of demand recording devices than those specifically illustrated and hereinafter described, are within the contemplation of the invention.

The fluid demand recording apparatus of the present invention, as it is illustrated in its preferred form in the accompanying drawings, consists essentially of three separate and distinct elements, namely a fluid volume meter exemplified in the drawings by a "dry" gas meter 10, an electrically controlled and chronometrically operated recording instrument which is entirely separable physically from the meter unit, and means for effecting physical and operative connections between said meter and said recording instrument comprising essentially a special form of electric switch, preferably so mounted within the upper compartment of the meter that one of its parts will engage a moving part of the meter so as to make and break an electrical circuit controlling the recording instrument each time a unit volume of fluid is passed through the meter, at such times as there is a physical connection between the contact points of said switch and the corresponding terminals of the electrical controlling circuit of said recording instrument.

While the volume type "dry" gas meter 10 which is illustrated in the accompanying drawings is well known in the art and its design forms no part of the present invention, it will be hereinafter briefly described in order that the design and operation of the improved fluid demand recording apparatus of the present invention may be more readily understood.

As shown in the drawings (see particularly Figs. 1 and 2) the interior of the box formed by the meter casing is divided by a horizontal partition 12 into an upper compartment 14 and a lower compartment 16. Gas, which for purpose of illustration will be hereinafter referred to as the fluid, the rate of withdrawal of which form a source of supply is to be measured by the apparatus of the present invention, enters the meter from its source of supply through an inlet pipe 18 and exits from the meter through an outlet pipe 20. The operation of the valve mechanisms mounted in the upper right hand part of the compartment 14 (not shown) is so timed that in passing through the meter gas is in turn admitted and then exhausted from four chambers of substantially equal volume, said chambers being formed respectively on the interior and exterior of a pair of collapsible bellows or diaphragm members 22 having flexible walls. A vertical partition 24 (indicated in dotted lines in Fig. 2) divides the lower compartment 16 of the meter 10 into two chambers of substantially equal capacity, and one of the diaphragm members 22 is mounted in each of these chambers. The rate at which gas is passing through the meter is indicated by the rapidity with which diaphragm members 22 expand to their full capacity and then collapse. The open end of each of the diaphragm members 22 is firmly affixed to the partition 24 by gastight joints, while the free end of each diaphragm is equipped with a metal disk 26 having a rock shaft 28 journalled by a bracket on its outer surface, said rock shaft in turn serving as the free axis of a hinge, flap or flag member 30. Two upright rods 32 extending upwardly into the compartment 14 are rigidly connected respectively to the diaphragm flags 30, thus constituting the stationary axes about which said flags oscillate as the diaphragms 22 expand and contract. Two bell crank members comprising flag arms or links 34, pins 36 and links 38 form an operative connection between the upper ends of rods 32 and a pin 40 forming an integral part of an internally threaded tangent bat or nut member 42. The internal threads of the tangent bat 42 engage a threaded portion of the crank member 44. With this construction the position of the tangent bat with respect to its distance from the axis of rotation of the crank 44 in a vertical shaft or post 46 can be adjusted. The connection between each tangent rod 32 and the corresponding flag arm 34 is rigid. Thus when the meter is in active operation the oscillatory movement of the flags 30, caused by the alternate expansion and deflation of the diaphragms 22, is transmitted through the flag rods 32 and the bell crank members connecting these rods with the pin 40, to the tangent bat 42 on crank 44, causing the crank to swing in a circular path around its vertical axis in post 46. A worm 48 is rigidly keyed to post 46, and a horizontal index shaft 50 having its free end journaled in a bracket bearing 52 is mounted in the gallery 14 in a position such that the teeth of a pinion 54 keyed thereto will co-operatively engage the teeth of worm 48. The other end of shaft 50 is operatively connected with an index or integrating mechanism housed in a box 56 (see Fig. 3) affixed to the upper front part of the meter casing. By the arrangement of parts and connecting links above described the rate at which gas is passing through the meter 10 can be translated into a proportional rotational movement of worm 48, pinion 54, shaft 50 and the index mechanism housed in box 56 thereby affording a visible indication of the total amount of gas passed through the meter.

As illustrated in the drawings, the electrically controlled and chronometrically operated recording instrument of the present invention is preferably housed in a casing entirely divorced from the meter with which it may, when desired, be operatively connected. While the essential features of construction of the recording instrument illustrated in the drawings are well known, and accordingly of themselves form no part of the present invention, they will be hereinafter briefly described in order that the assembled fluid demand recording apparatus may be more clearly understood.

The recording instrument illustrated in Fig. 1 of the drawings comprises esentially an outer casing or box 60 housing a chronometer mechanism 62, with its attendant gear trains, recording equipment and electrical devices for controlling the same. The recording equipment includes a drum or cylinder 64 having internal threads or catches engaging the threaded portion of a stationary horizontal shaft 66 and designed to support a record sheet 68. The drum 64 with its supported record sheet is so positioned within the casing 60 that as the drum is rotated by the chronometer mechanism with which it is operatively connected, a line will be made on the record sheet by reason of the movement of the sheet past a pen or stylus to be hereinafter referred to. The essential members of the chronometer driving mechanism by means of which the drum 64 is rotated at a constant rate about its central axis in shaft 66 include a horizontal drive shaft 69 to which is keyed or on which there is cut a spur gear 70 whose length approximates the possible length of travel of the recording cylinders 62 from right to left along the threaded portion of shaft 66. The free end of shaft 69 is journalled in a bearing 72, and the rotation of the drum 64 is effected by the chronometer 62 acting through gear 70 and a pinion 74 rigidly affixed to the drum and having its teeth in operative engagement with the teeth of the spur gear 70. At the same time that the drum is rotated at a constant rate about the shaft 66, it is caused to slowly advance from the right hand toward the left hand side of the box 60 along the threaded portion of the shaft 66. The various members of the chronometer driving mechanism of the recording instrument illustrated in Fig. 1 are so proportioned that the drum performs two complete revolutions about shaft 66 in 24 hours and takes seven days to traverse the horizontal path of travel measured by the threaded portion of shaft 66 from the right to the left hand extremity thereof.

In operation charts of the general type illustrated in Fig. 1 are affixed to the circumference of the drum 64, interlineations on the charts being designed to give an accurate record during a weeks' interval of the operation of the particular volume meter with which the recording instrument may be operatively connected. The actual making of the record on the chart is accomplished through the medium of an electrically controlled stylus or recording pen 78, the point 80 of which is set to bear on the surface of the recording chart. In operation the stylus 78 shown in Figs. 1 and 3 is given an oscillatory motion about its pivotal support 82 in a supporting bracket 84 by the intermittent energization of an electric solenoid member 86, thereby making a visible jagged line on the chart 68 by reason of the movement of the chart at a constant rate beneath the point of the pen. The intermittent energization of the solenoid 86 is effected by an intermittent flow through coils 88 of the solenoid of an electric current supplied by a series of batteries 90. Whenever the solenoid 86 is energized by flow of electrical current from the batteries 90 through its coils 88, a contact member 92 affixed to the pen 78 is drawn toward the core of the solenoid, causing the point 80 of the pen to swing in an arc to the left about its pivotal axis 82. A spring 94, attached at one end to the pen 78 and at the other to an arm 96 of bracket 84, normally holds the member 92 out of an engagement with a guard member 98 over the core of solenoid 86 in the position in which it is illustrated in Fig. 1, except during periods when the solenoid is energized by current flowing through the circuit of the batteries 90.

It will be observed that lead wires 100 and 102 of the electrical circuit including batteries 90 terminate respectively in separated contact points 104 and 106 of a relay member 108. Accordingly no current can flow through the circuit of batteries 90 to effect energization of solenoid 86 except during the brief intervals in which the contact terminals 104 and 106 of the relay member 108 are joined by a conductor 110 mounted on the free end of an arm 112 having its other end pivoted at point 114. The conductor 110 is normally held out of engagement with the contact points 104 and 106 by a spring 116, assuming the position illustrated in Fig. 1. However a solenoid 118 is so positioned with respect to the arm 108 that whenever it becomes energized by reason of the flow of an electric current supplied by a battery 120 through its coils 122, the arm 108 is drawn downwardly toward the core of the solenoid against the tension of spring 116, causing the conductor 110 to engage points 104 and 106 and thereby closing the circuit through leads 100 and 102 and energizing the solenoid 86 actuating pen 78. As soon as the solenoid 118 is de-energized the conductor 110 is again thrown out of contact with conductors 104 and 106, assuming the position illustrated in the drawings, by reason of the action of spring 116. Accordingly it will be seen that the pen 78 will normally give a straight line record on the chart 68 of the recording instrument, but may at intervals be swung to the left to give a jog in the straight line whenever, by reason of the flow of current through the coils of solenoid 118, the terminals of lead wires 100 and 102 are joined by conductor 110, thereby energizing solenoid 86. It will be observed that the lead wires 124 and 126 of the electrical circuit including the battery 120 and coils 122 of the relay solenoid 118, terminate respectively in a pipe clip 128 and in the contact plug 130 (see Figs. 1 and 2) of an insulated jack.

The circuit closing device by means of which an operative connection can be established between the flag arm 34 or similar movable portion of the volume meter 10 and the recording stylus 78 of the recording instrument discussed above, will now be described. The circuit closing device as it is illustrated in Figs. 1 and 2 of the accompanying drawings consists essentially of a liquid contact tipping switch 132 having a gas-tight sealed mercury contact chamber 134 supported in the upper compartment 14 of the meter 10 by the weighted arm 136 of a specially designed bracket 138. The bracket 138 is movably mounted on a pivotal pin 140 which is in turn rigidly affixed by a bracket member 142 to the floor of the compartment 14. A small amount of mercury or other electrically conductant contact liquid 144 is sealed within the contact chamber 134 of the liquid contact tipping switch, and one of two contact points sealed within chamber 134 is grounded to the meter casing by a flexible connection 146, while the other sealed contact point is connected by a conductor 148 to the fixed contact member 150 of an insulated jack member 152 which may be mounted in a convenient place in the front or side of the meter casing. It will be observed that the bracket 138 which supports the sealed contact member of the liquid contact switch has an arm 154 extending upwardly from its pivotal point 140 into the path of travel of one of the flag arms 34 of the meter 10. Normally the switch 132 is held in the position illustrated in Fig. 1 of drawings by reason of the gravity pull on the weighted arm 136 of the supporting bracket 138. However once during each revolution of the tangent nut 42 of the meter mechanism about the post 46 (see Fig. 2) the front flag arm 34 of the meter mechanism is swung through its arc of travel into the position indicated in dot-dash lines in Fig. 2. In traversing its arc of travel about its pivotal point in rod 32, the front flag arm 34 of the meter swings past the point in its path of travel normally occupied by the tip of the upright arm 154 of the bracket supporting tipping switch 132. Accordingly, as the front flag arm 34 reaches this point in its swing to the left of the position illustrated in Fig. 2, it engages the arm 154 of the bracket supporting the tipping switch and as it continues to move to the left the tipping switch is forced out of its normal position, swinging in an arc about its pivot 140 until as the flag arm 34 reaches the extremity of its swing to the left, the switch 132 at the same time assumes a position where the contact liquid 144 in the chamber 134 effects a contact closure between the sealed contact terminals of connections 146 and 148, such closure lasting for a fraction of the time taken for each revolution of the shaft 48. As the front flag arm 34 again swings to the right about its axis 32, the tipping switch 132 is again swung back to the position illustrated in the drawings by reason of the gravity pull on the weighted bracket arm 136, and contact between the terminals of the connections 146 and 148 is thus broken and remains so until such time as the flag arm again swings to the extreme left of its arc of travel to again tip the switch sufficiently to cause the contact liquid 144 to flow down into that end of the chamber 134 in which the terminals of the connections 146 and 148 are sealed. All that is necessary in order to operatively connect the lead wires 146 and 148 of the circuit closing device 132 with the circuit energizing the solenoid 118 by which the stylus 78 on the recording instrument is ultimately controlled, is to ground the lead 124 of the circuit for energizing solenoid 118 to the meter swivel by clamping the fixtures 128 thereto (see Fig. 1) and to insert the plug 130 at the end of the other lead wire 126 of the circuit energizing solenoid 118 into the socket of the insulated jack 152 to make contact with the member 150.

The primary object of the relay mechanism 108 illustrated in Fig. 1 of the drawings, is to permit the use of a relatively low voltage circuit which will be free from arcing trouble in the circuit closing device 132, while at the same time permitting the use of a circuit of considerably higher voltage for actuating the mechanism controlling the movements of the recording pen 78. In Fig. 3 of the drawings a modified form of the present gas demand recording apparatus is illustrated diagrammatically, from which the relay mechanism 108 has been eliminated. It has been found that the present apparatus can be operated with one electrical circuit of relatively low potential, thereby eliminating the need for a secondary circuit and relay member, by placing the circuit closing device 132 and the solenoid 86 actuating the stylus 78 of the recording instrument in a single circuit of slightly higher potential than that which would normally be supplied from the battery 120 to the secondary relay circuit of the apparatus shown in Fig. 1. The source of the higher potential current energizing the solenoid 86, of Fig. 3 lies in a series of batteries 155 having their terminals 100 and 102 in circuit with the coils of the solenoid 86 and connected respectively to the plug of the insulated jack 152 and to the meter swivel or body.

In Figs. 5 and 6 of the drawings a modified form of the circuit closing device is illustrated, characterized by its great simplicity, economy and durability of construction. The circuit-closing device shown in Figs. 5 and 6 differs in construction from the device of Figs. 1 and 2, chiefly in the following respects: The L-shaped weighted switch supporting member 138 of Figs. 1 and 2 has been replaced, in the design of Figs. 5 and 6, by a metal block 160 pivotally supported on the pin 140, which is in turn supported and rigidly connected with the gallery floor 12 by a U-shaped base 142. A brass or other corrosion resistant metal clip 162 supports and rigidly connects the liquid chamber 134 to the block 160, thus eliminating from the design the weighted arm 136 of the mechanism of Figs. 1 and 2. The arm 154 of the supporting bracket 138 shown in Figs. 1 and 2 has been replaced in the device shown in Figs. 5 and 6 by a tipping rod 164. The lower end of tipping rod 164 is threaded and is fitted into a cylindrical opening or core in the block 160. Insulation blocks of fibre or other suitable material 166 are mounted on the top of block 160 and the lead wires 146 and 148 of the liquid contact switch 132 are passed through these blocks, the blocks thereby protecting the lead wires against short-circuiting or mechanical injury. Insulation blocks 166 are in turn surmounted by lock nuts 168 engaging a threaded portion of rod 164, such lock nuts permitting the adjustment of the length of the rod and serving to hold the rod in the desired position.

The circuit closing device shown in Figs. 1 and 2 is so proportioned, and the pivot is so arranged with respect to the weighted arm 136, that the switch 132 will remain in one position, due to the weight of the arm 136, until pushed or moved out of position by front flag arm 34. Furthermore as the flag arm returns to the position illustrated in Fig. 1 after pushing the tipping switch out of its normal open position, the tipping switch operates by gravity to resume its initial position (shown in Fig. 1). There is a possibility that corrosion or other cause might hinder the gravity return of the tipping switch to a normal open position, particularly after the meter has been in service for a period of years. This possibility has been eliminated in the device illustrated in Fig. 4 by providing a direct positive connection between the flag arm and the upright arm of the tipping switch. Thus as shown in Fig. 4 the rod 164 of the tipping switch of Fig. 5 and 6 or the arm 154 of member 138 (Figs. 1 and 2) is positively connected to the flag arm 34 by a slotted connecting link 170. One end of link 170 is soldered or otherwise fixed to the flag arm 34 and a slot opening 172 is provided in the free end of link 170 through which the upright end of the arm 154 or the rod 164 of the tipping switch projects. The relative sizes of the hole or slot 172 in the connecting link and of the diameter of the upwardly projecting arm of the tipping switch are so proportioned that there is sufficient freedom for correct operation without excessive play or tolerance. The shape of the slot 172 is elliptical in order to compensate for the straight line motion of the tipping switch and the partly circular or arc motion or path of the end of the connecting link 34 with which the tipping switch lever or rod 164 engages.

In normal operation of the apparatus of the present invention closure of the circuit between the mercury and the metallic contact points sealed in the tipping switch 132 preferably exists for about one-third of the period occupied by a complete revolution of the tangent bat 42. Ample time of contact or closure of the circuit of the tipping switch during each revolution of the meter tangent is preferably provided in order to take care of the contingency which might arise in case the meter should be installed in such a way that the compartment floor 12 of compartment 14 is not strictly horizontal. Thus it is conceivable that under normal installation methods designed for very short closures the tilting of the meter might be of such magnitude and direction with respect to the horizontal that no closure of the tipping switch circuit would result during a complete revolution of the tangent bat.

Since closure of the operating circuit of the demand recording instrument by the tipping switch 132 normally lasts throughout about ⅓ of the time occupied by each revolution of the meter tangent it is apparent that current is flowing in such circuit about ⅓ of of the time that the demand recording apparatus is operatively recorded with the meter. Due to the small capacity of the dry cells or similar sources of electrical energy which will normally be used with the present apparatus the number of such cells which would be required to furnish current over a relatively long period might prove prohibitive. A modification in the design of the electrical circuit of the demand recording apparatus has been effected for the purpose of reducing the length of time during which the operating current is in use per revolution of the meter tangent. The details of this modified design are illustrated in Fig. 7. In general it consists of a relay 174 utilizing only a very small percentage of the current normally required to operate the main solenoid 84. When the plunger 176 of the main solenoid 84 reaches the end of its upstroke it closes an electrical contact between the stationary contact point 178 and a movable contact point 180 of a switch 182, thus closing a circuit through the leads 184 and 186 and placing the solenoid of the relay 174 in operation. When the solenoid of relay 174 is energized it in turn opens a double contact switch 188 in the circuit of the main solenoid 84, illustrated in Fig. 7, with its points 192 in closed position, switch 188 at the same time closing a secondary circuit through contact points 190 whereby relay 174 is caused to remain energized until the tipping switch circuit opens. As soon as the said switch circuit opens the relay 174 returns switch 188 to its original position (shown in Fig. 7 of the drawings) thereby closing the main solenoid circuit through contact points 192 and opening the secondary relay circuit through contacts 190. By the arrangement just described the current consumption of the demand recording apparatus can be reduced to at least 1/30 that which would be required should the main solenoid be kept operative during the entire closure period of the tipping switch 132.

In operation the rate at which gas is passing through the meter 10 is translated into a proportional rate of movement of the front flag arm 34 between the extremities of its arc of travel about the top of flag rod 32. The front flag arm 34 reaches the left extremity of its arc once each time the meter 10 passes a unit volume of gas. Accordingly the circuit closing device 132 effects closure of the electrical circuit energizing solenoid 118 of the relay member 108 for an instant each time the meter 10 passes a unit volume of gas, whenever the electrical controlling circuit of the recording instrument 60 is placed in operative relation with the device 132 by clamping the clip 128 to the meter swivel and inserting the plug 130 into the socket of the insulated jack 152 in the manner illustrated in Fig. 1. It will be observed that the circuit of solenoid 118 is normally closed only for an instant and that the closure takes place during the interval in which the front flag arm 34 of the meter is at the extreme left hand extremity of its stroke, with the apparatus arrangement illustrated in Fig. 1. At the same instant that solenoid 118 of the relay becomes energized the solenoid 84 controlling the operation of the stylus 78 also becomes energized for an instant by reason of the brief closure effected between the contact points 104 and 106 of the relay member through the conductor 110. During the brief instant in which the solenoid 84 is energized, the tip 80 of pen 78 is swung through a short arc to the left of its normal position (see for instance, Fig. 1) thus making a noticeable jog in the normally straight line which the pen is tracing on chart 68. The spaces formed on the chart 68 between each pair of horizontal lines 156 are equal and are preferably chosen to represent the distances through which the face of the chart travels beneath the point 80 of pen 78 during predetermined equal short intervals of time—for example during 15 minute intervals. Accordingly the number of jogs 158 in the line traced by the stylus in traversing the space measured between each pair of horizontal lines 156 indicates the number of unit volumes of gas passed by the meter 10 during the unit interval of time represented by this space. Not only is the number of jogs 158 between each pair of lines 156 proportional to the number of unit volumes of gas passed by the meter during the predetermined short time interval, but also the space between each pair of jogs in the line traced by pen point 80 represents the proportional rate at which gas was being passed by the meter during any given portion of the unit interval of time marked off between the corresponding pair of lines 156. It will be understood that the present invention includes within its scope apparatus which normally operates to record the rate at which gas or other fluid is passed by the volume meter in multiples of the unit volume capacity of the meter, and that it also contemplates other types of recording instruments than that illustrated for taking a visible record of the rate at which a given meter passes gas during intervals in which such recording instrument is operatively connected with the meter. For example, it will apparent that the flange arm 34 of the meter normally makes as high as several hundred oscillations per hour when the meter is operating near its rated capacity, so that if an equivalent number of marks or jogs were made on the chart of the recording instrument in the corresponding space of approximately one inch, such jogs would overlap and become substantially illegible. For this reason the motion of the flag arm 32, as communicated through the mechanism described to the main solenoid 84 of the demand recording instrument, is normally reduced before being communicated to the chart of the recording instrument so that a plurality of solenoid motions is represented by a single jog in the record line. As shown in Fig. 7 this reduction may be accomplished by recourse to the familiar pawl and ratchet device commonly used with the type of demand recording instrument illustrated. Essentially the mechanism for effecting this reduction includes a ratchet gear 193 keyed to a shaft 194 to which there is also rigidly keyed a radially extending pin 196 having its free end beveled and arranged to engage for an instant only during each revolution of the ratchet, a bevelled projection 198 on the pivoted pen 78 of the recording instrument, thereby forcing the pen out of its upright position against a stop pin 200, where it is normally held by a spring 202. The rotation of the shaft is effected by the plunger 176 of the main solenoid 84 acting through an arm 204, one end of which is linked to the lower end of plunger 176 while the other rides free on the shaft 194. An operating pawl 206 is attached to the arm 204 and is held in contact with the teeth of the ratchet by a spring 208, while a catch pawl 210 is pivoted in a panel board mounted adjacent the ratchet and is in held in contact with the teeth of the ratchet by a spring 212. Each time the plunger 176 travels one stroke the ratchet 193 is caused to traverse a circumferential distance equal to the length of one of its teeth, through the combined action of the arm 204 and the pawls 206 and 210. The number of teeth on the ratchet 193 determines the number of movements of solenoid plunger 176 which take place for each line jog produced by the pen 78 due to its displacement by the pin 196.

One advantageous feature of the gas demand recording apparatus of the present invention is that the demand recording instrument 60 can be assembled in a housing of convenient size for ready transportation from point to point, and is physically divorced from the various volume meters with which it may be operatively connected, thus permitting the use of one recording instrument for determining the demands measured by a plurality of volume meters; each of such volume meters being of course equipped with a suitable circuit closing device and insulated jack socket.

Another advantageous feature of the present invention is that the circuit closing device is housed in its entirety within the casing of the volume meter so that it is protected from mechanical injury except in cases where the meter itself is badly damaged. With this arrangement of meter and circuit closing device all danger of tampering or interference by unauthorized persons in practically eliminated.

Another advantageous feature of the present apparatus is that the circuit closing device embodies only one moving part, namely the pivotal mounting of the tipping switch having its upright arm actuated by the flag arm of the meter. This simplicity of design materially reduces the initial and upkeep cost of the circuit closing device and allows for a more durable and rugged construction.

The use as the circuit closing member of the apparatus of a sealed liquid contact type switch eliminates any danger which might otherwise be incurred due to the presence of an electric open make and break device within the meter casing. While in theory there should be no gas leakage into the compartment 14 above the meter table 12, it is well known that in practice there is generally some leakage through the stuffing boxes, which tends to form an explosive mixture with the atmosphere in the upper portions of the meter. With the sealed liquid contact switch type of circuit closing device illustrated in the drawings there is no danger of igniting gas leaking from the meter or connections into the vicinity of the circuit closing device.

The apparatus of the present invention is so designed that one electromagnetic recording device can be used with any type of volume fluid meter properly equipped with a suitable circuit closing device and insulated jack socket. This arrangement is extremely advantageous in that there is no need to change the volume meter every time it is desired to take a record of the demand. The cost of the equipment is kept at a minimum and the recording member can be quickly changed from one volume meter to another without waiting for mechanics or fitting experts to do the work. Moreover if the recording instrument should become damaged or need reconditioning or repairs it can be readily accomplished without the necessity of replacing the meter member and without any longer interruption in taking demand records than is necessitated in making a substitution of another recording instrument for the one that is out of order.

Another advantageous feature of the apparatus of the present invention is that an operative connection can be effected between the moving parts of the meter and the electromagnetic controlling mechanism of the recording instrument without any danger of developing or opening up leaks in the meter casing for the escape of gas. There are no operating parts of the mechanism passing through the outside meter casing and accordingly there is no need of gastight joints or stuffing boxes at the points where such parts would have to pass through the casing. The insulated jack socket into which the electrical controlling circuit of the recording instrument is plugged or connected can easily be built in as a gas tight portion of the meter casing, and once the socket of the jack is thus built into the casing there is no liability of developing a leak when the circuit of the recording instrument is plugged into the jack.

The various features of the invention having been thus described, what is claimed is:

1. In a fluid volume meter having an outer enclosing casing and a part which moves in a definite path at a rate which is proportional to the rate at which fluid is withdrawn through said meter from a source of supply, a switch for making and breaking an electrical circuit each time the meter passes a unit volume of fluid, said switch being housed in a gas-tight casing and being pivotally mounted within the casing of said meter and having a part disposed in the path of said movable part of said meter, the mounting of said switch being such that it is thrown from a normally open to a closed position for an instant each time that said meter part traverses a certain portion of its path.

2. In a fluid volume meter having an outer enclosing casing and an element movable in a fixed path at a rate proportional to the rate of flow of fluid therethrough, a liquid contact tipping switch having a sealed contact chamber movably mounted within the meter casing, an insulated jack socket mounted in the meter casing, a connection between the fixed contact member of said jack and one of the contact points of said switch, the other contact of said switch being grounded, an electrical connection between the plug contact member of said jack and one terminal of an electrical circuit outside said meter, the other terminal of said circuit being grounded, and an operative connection between said switch and said movable part of said meter whereby whenever the plug and socket members of said jack are co-operatively joined the contact chamber of said switch will be tipped from a normally open to a closed position for an instant each time said meter passes a unit volume of fluid.

3. In a gas demand recording apparatus the combination with an integrating volume gas meter and an electrical control circuit, of a liquid contact switch having a gastight contact chamber movably mounted in the casing of said meter, a jack mounted on the meter casing and connections for placing said switch in circuit with the electrical control circuit, means for normally maintaining said switch in a position where no current can flow through said control circuit, and means for periodically placing said switch in operative engagement with a moving part of said meter whereby to throw said switch into a position to effect closure of the electrical control circuit.

4. In a gas demand recording apparatus the combination with an integrating volume type gas meter having an outer enclosing casing and a flag arm rotatable at a rate proportional to the rate of flow of gas through the meter, of a sealed liquid contact tipping switch having a supporting member pivotally mounted within the meter casing with an arm arranged for operative engagement with said flag arm, the flag arm of said meter being arranged to operate on said switch through the arm of its supporting member to tip the switch from a normally open to a closed position each time the flag arm rotates.

5. In a fluid meter having an outer enclosing casing, a crank arm in said casing arranged to be operated by the flow of fluid through the meter, and a sealed liquid contact type electrical switch pivotally mounted in said casing with a part normally presented in the path of said crank arm, said switch having a contact chamber sealed against entrance of fluid being metered and being arranged to be tilted by said crank arm at each revolution of said crank arm.

6. In a flow meter having an oscillating element operable by and at a rate proportional to the flow of fluid therethrough, means adapted to make and break an electric circuit each time a unit volume of flow takes place through the meter, comprising a unitary trip lever and a normally open liquid contact tipping switch pivotally mounted on a fulcrum with the end of the trip lever normally disposed in the path of said oscillating element, the relative positions of the oscillating element and the trip lever being such that the oscillating element will briefly engage the trip lever and thereby tilt the switch at each rotation of the oscillating element.

7. In a flow meter having an oscillating element operable by and at a rate proportional to the flow of fluid therethrough, means adapted to make and break an electric circuit each time a unit volume of flow takes place through the meter, comprising a unitary trip lever and sealed liquid contact tipping switch pivotally mounted on a fulcrum with the end of the trip lever normally disposed in the path of said oscillating element, the relative positions of the oscillating element and the trip lever being such that the oscillating element will briefly engage the trip lever and thereby tilt the switch at each movement in one direction of the oscillating element, said trip lever and switch unit being heavier at one end than at the other whereby it gravitates to a predetermined normal position whenever disengaged by the oscillating element.

8. In a fluid volume meter housed within a casing and having an element adapted to oscillate in a fixed path at a rate proportional to the rate of flow of fluid therethrough, means arranged to make and break an electric circuit each time the meter passes a unit volume of fluid comprising a sealed fluid contact switch pivotally mounted within said meter casing with a trip lever extension normally disposed in the path of said element in position to be tilted thereby at each movement of the oscillating element in one direction.

9. In a fluid volume meter housed within a casing and having an element oscillatable in a fixed path at a rate proportional to the rate of flow of fluid therethrough, means arranged to make and break an electric circuit each time the meter passes a unit volume of fluid comprising a sealed fluid contact switch pivotally mounted within said meter casing with a trip lever extension normally disposed in the path of said oscillatable element in position to be tilted thereby during each movement of the latter in one direction, and means whereby said switch is automatically returned to its normal position whenever disengaged by the oscillatable element.

10. A switching device comprising a normally open, pivotally mounted liquid contact tube switch, an expansible bellows member adapted to be alternately inflated and deflated by fluid under pressure, means operatively interposed between the bellows member and the said switch and adapted to be actuated by the former, means operatively connected with the switch and actuated by the last-named means for tipping the switch to closed position thereby closing a main electric circuit, and an electric relay circuit operatively connected with the said switch and with a recording device and adapted to be closed when the switch is in closed position.

11. In a fluid volume meter housed within a casing and having an element movable in a fixed path at a rate proportional to the rate of flow of fluid therethrough, means adapted to make and break an electric circuit each time the meter passes a unit volume of fluid, the last-named means comprising a sealed fluid contact switch pivotally mounted within the said meter casing and having a trip lever extension normally disposed in the path of the said movable element in position to be tilted thereby at each movement of the movable element in one direction, and means adapted to operatively connect the said electric circuit with a fluid demand recording apparatus.

12. In a flow meter having an oscillatable member operable at a rate proportional to the flow of fluid through the meter, means adapted to make and break an electric circuit each time a unit volume of fluid flows through the meter, the said means comprising a unitary sealed liquid contact tipping switch and trip lever pivotally mounted in the meter with the end of the trip lever normally disposed in the path of the said oscillatable member, the relative positions of the said member and the trip lever being such that the oscillatable member will briefly engage the trip lever and thereby tilt the switch from a normal open position at each oscillatory movement of the said member in one direction, positive means for returning the switch to its normal position whenever disengaged from the oscillatable member, and an electric relay circuit connected with and controlled by the first-named electric circuit when the latter is energized by the said circuit make and break means.

13. In a fluid demand recording device, the combination of a main electric circuit, an electric relay circuit adapted to be closed upon the closing of the main electric circuit, an electrically-controlled, chronologically-operated recording device in the main circuit, a switching device comprising a normally open, pivotally-mounted liquid contact tube switch in the main circuit, an expansible bellows member adapted to be alternately inflated and deflated by fluid under pressure, means operatively interposed between the bellows member and the said switch and adapted to be actuated by the former for intermittently tipping the switch to closed position, for closing the main circuit, thereby causing a flow of current through the main electric circuit, the said electric relay circuit being operatively connected with the said switch and with the recording device and being adapted to be closed only when the switch is in closed position.

In testimony whereof I affix my signature.

ROBERT H. TAYLOR.